US011188482B1

(12) United States Patent
Shung

(10) Patent No.: US 11,188,482 B1
(45) Date of Patent: Nov. 30, 2021

(54) APPARATUS AND METHOD OF ZERO-COPY APPLICATION CO-PROCESSOR WITH STORAGE CLASS MEMORY

(71) Applicant: Wolley Inc., San Jose, CA (US)

(72) Inventor: Chuen-Shen Bernard Shung, San Jose, CA (US)

(73) Assignee: Wolly Inc., San Jose, CA (US)

( * ) Notice: Subject to any disclaimer, the term of this patent is extended or adjusted under 35 U.S.C. 154(b) by 0 days.

(21) Appl. No.: 16/917,392

(22) Filed: Jun. 30, 2020

(51) Int. Cl.
*G06F 13/16* (2006.01)
*G06F 13/42* (2006.01)
*G06F 13/28* (2006.01)

(52) U.S. Cl.
CPC .......... *G06F 13/1668* (2013.01); *G06F 13/28* (2013.01); *G06F 13/4221* (2013.01); *G06F 2213/0026* (2013.01)

(58) Field of Classification Search
CPC ... G06F 13/1668; G06F 13/28; G06F 13/4221
See application file for complete search history.

(56) References Cited

U.S. PATENT DOCUMENTS

| | | | | |
|---|---|---|---|---|
| 6,389,433 B1 * | 5/2002 | Bolosky | ............... | G06F 11/1453 707/749 |
| 7,249,227 B1 * | 7/2007 | Pittman | ............... | G06F 3/0611 711/154 |
| 7,330,862 B1 * | 2/2008 | Srinivasan | .......... | G06F 12/0866 |
| 8,504,744 B2 * | 8/2013 | Khawer | ................ | G06F 9/5011 710/56 |
| 10,229,047 B2 | 3/2019 | Shung | | |
| 10,353,812 B2 | 7/2019 | Shung | | |
| 10,389,658 B2 * | 8/2019 | Reents | ................ | G06F 15/163 |
| 10,394,708 B2 | 8/2019 | Shung | | |

OTHER PUBLICATIONS

G. Burr et al., "Overview of candidate device technologies for storage-class memory", IBM Journal of Research and Development 52(4/5): pp. 449-464, Jun. 2008.

* cited by examiner

*Primary Examiner* — Tammara R Peyton
(74) *Attorney, Agent, or Firm* — Blairtech Solution LLC

(57) ABSTRACT

A method and apparatus managing online transaction using a computer system are disclosed. According to the present invention, a target request is received by a CPU coupled to a main memory and a memory application co-processor via a memory bus. The CPU then stores the target request onto the memory application co-processor coupled to a storage class memory. The memory application co-processor then locates target contents, inside the storage class memory, where the target key-word is specified in the target request. The CPU or a coupled device then accesses the target contents associated with the target key-word inside the storage class memory directly without copying the target contents associated with the target key-word inside the storage class memory to or from the main memory.

14 Claims, 3 Drawing Sheets

APPARATUS AND METHOD OF ZERO-COPY APPLICATION CO-PROCESSOR WITH STORAGE CLASS MEMORY

FIELD OF THE INVENTION

The present invention relates to memory control. In particular, the present invention relates to enabling a new scheme that can accelerate application performance by removing the need for copying matched data from a storage media to main memory.

BACKGROUND AND RELATED ART

In computer architecture the memory hierarchy is a concept used for storing and discussing performance issues in computer architectural design, algorithm predictions, and the lower level programming constructs such as involving locality of reference. The memory hierarchy in computer storage distinguishes each level in the hierarchy by response time. Since response time, complexity, and capacity are related, the levels may also be distinguished by their performance and controlling technologies.

In the context of this disclosure, the memory hierarchy of interest consists of (a) processor registers, (b) caches (L1, L2, L3, etc.), (c) main memory, and (d) disk storage. For memory devices that are "farther" away from the CPU (or "lower" in the memory hierarchy), the capacity is bigger while the response time is longer. The capacity of these memory devices is in the order of (a) less than Kilobytes, (b) Megabytes to tens of Megabytes, (c) tens of Gigabytes, and (d) Terabytes, respectively. The response time of these memory devices is in the order of (a) sub-nanoseconds, (b) nanoseconds, (c) tens of nanoseconds, and (d) tens of milliseconds for random access of Hard Disk Drives (HDDs), respectively. In recent years, one of the major technology advancement in memory hierarchy has been the wider adoption of solid-state disks (SSDs), built with NAND Flash, which improves the disk response time to tens of microseconds.

Even with SSDs, there is still a big gap in response time between (c) and (d). On top of that, (a)-(c) are "byte-addressable" (although in practice, memory hierarchy levels (b)-(c) are often addressed with 64-byte unit), while memory hierarchy level (d) is "block-addressable" with a block size typically 512-byte or 4K-byte. In computer terms, the former is a "memory access" while the latter is a "storage access" or "I/O (Input/Output) access". The different access semantics and block transfer size also increase the overhead of accessing the disk.

One attempt to avoid the disk access as much as possible, in order to improve performance, is to increase the main memory capacity. However, due to cost and power reason, there is a bound to this investment, especially as the Moore's Law scaling for DRAM will no longer be able to reduce cost and power much more. Furthermore, given the overwhelming trend of cloud computing and big data applications, the data size of interest is getting bigger and bigger, and hence simply trying to increase main memory capacity will lose in this foot race.

Other than response time and capacity difference, there is also another significant difference between memory and disk. Memory is volatile and disks (SSDs or HDDs) are non-volatile. When power is lost, the memory content is lost, while the disk content is kept. It is very important for online transaction processing (OLTP), which requires to capture, store, and process data from transactions in real time. The OLTP needs to write the results to some non-volatile storage to formally complete the transaction in order to safeguard against unexpected power loss. This is another reason why disk operations are necessary. How to efficiently interact with disks while not slowing down the operation performance has been an active topic of research and development by computer scientists for decades.

Therefore, it is intuitively obvious that it would be ideal to have a memory device that has the response time and byte-addressable property of the memory, and the capacity and non-volatile property of the disks. This kind of memory is generally referred to as the Storage Class Memory (SCM) (G. Burr et al., "Overview of candidate device technologies for storage-class memory", *IBM Journal of Research and Development* 52(4/5): pp. 449-464, June 2008). SCM is a new tier of memory/storage that sits between DRAM (at the top) and NAND flash (at the bottom) as it pertains to performance, endurance and cost. Unlike DRAM, SCM is non-volatile to retain data stored in power cycles. On the other hand, compared to NAND flash, SCM is orders of magnitude faster for both read and write operations. SCM has much higher endurance than NAND flash and has a much lower cost/GB than DRAM. In the past many years, there were numerous attempts by different companies and research groups to develop SCMs using different materials, processes, and circuit technologies. Some of the most prominent examples of SCMs to date include Phase Change Random Access Memory (PCRAM), Resistive Random Access Memory (RRAM), and Spin-transfer torque Magnetic Random Access Memory (STT-MRAM). In 2015, Intel™ and Micron™ announced advanced SCM that is claimed to be "1000 faster than NAND flash and 10 times denser than DRAM". When SCMs become available, many believe that a natural place in the memory hierarchy for SCMs will be between memory hierarchy level (c) and memory hierarchy level (d) mentioned above to bridge the gap in between.

As the size of memory and storage in a computer system gets bigger, one recent trend in computer architecture is to move the computation away from the CPU to a place closer to memory and storage. It is observed that data movement among memory, storage, and CPU consumes a lot of power, possibly even more than the computation itself. Therefore, it is more power efficient to compute inside or near memory and storage subsystem and only send the result to CPU for further processing. For example, a sorting operation can be performed inside memory and storage subsystem by a co-processor and only the sorting result is sent to the CPU.

In this disclosure, an application co-processor is referred to an entity that has certain specific computation capability. Pertaining to the abovementioned architecture, an application co-processor is often placed near memory or storage to offload the CPU for certain operations. In the following a memory application co-processor is referred to when the application co-processor is placed in the memory subsystem, and a storage application co-processor is referred to when the application co-processor is placed in the storage subsystem.

Traditionally a storage application co-processor is more common than a memory application co-processor. Due to inherent larger latency, a storage (IO) interface is usually asynchronous, in the sense that when CPU dispatches a storage request (e.g. read/write) it will not wait for the result. The CPU shall switch context to another process to maximize the computation efficiency. When the storage request is completed, the CPU will be interrupted to switch context back. On the other hand, a memory interface is usually synchronous, and the CPU will wait for the result for a memory request. Therefore, it is more convenient to insert an application co-processor in the storage interface. What it takes is to change the semantics of the interface from {read, write} to {operation1, operation2}.

In some applications, a computer system may need to perform searching, based on certain criterion (e.g. key words), among a large data set. The searching results need to be reported back to an entity requesting the searching. The large data set is often stored in a storage media such as NAND memory. In a typical arrangement, the request may be received by a CPU and placed in the main memory such as DRAM. The search may be performed by a storage application co-processor. The matched data are retrieved from the storage media into the main memory and then outputted to the entity requesting the data. The size of the matched data may be rather large and movement of the matched data to the main memory may consume a lot of power, possibly even more than the computation itself.

Another reason a storage application co-processor is more common is because the storage media often needs a controller to handle a number of media issues, such as wear leveling, ECC and bad block management. For the memory interface, only ECC is needed, and it is often done at the host side, and no controller is needed in the memory subsystem. Therefore, it is much easier to add the application co-processor function on top of the storage controller.

On the other hand, SCM has many characteristics that are similar to memory and many other characteristics that are similar to storage. For example, like NAND used in storage, SCM device also has finite write endurance, and requires a controller to perform wear leveling operation. The specific method to perform wear leveling operation for SCM devices was disclosed in U.S. patent Ser. No. 10/229,047, 10/353, 812 and 10/394,708.

In this invention, the issue associated with large data movement between storage media and the main memory is addressed. In particular, a memory application co-processor along with SCM is disclosed to provide a solution to eliminate the need for large data movement associated with matched data between a storage media and the main memory.

BRIEF SUMMARY OF THE INVENTION

A method and apparatus managing online transaction using a computer system are disclosed. According to the present invention, a target request is received by a CPU, where the CPU is coupled to a main memory and a memory application co-processor via a memory bus. The CPU then stores the target request onto the memory application co-processor, which is coupled to a storage class memory. The memory application co-processor then locates target contents, inside the storage class memory, associated with a target key-word, where the target key-word is specified in the target request. The CPU or a coupled device accesses the target contents associated with the target key-word inside the storage class memory directly without copying the target contents associated with the target key-word inside the storage class memory to or from the main memory. Accordingly, the computer system according to the present invention eliminates the need of copying the contents between the storage device and the main memory.

In one embodiment, the computer system further comprises a DMA (direct memory access) engine coupled to the memory bus and the DMA engine is configured to access the target contents associated with the target key-word inside the storage class memory. The coupled device may correspond to a networking interface coupled to the CPU via an IO bus, and in this case the target key-word corresponds to a target URL (Uniform Resource Locator). In one embodiment, the target contents associated with the target URL are accessed directly from the storage class memory and are sent to the network interface through the DMA engine without going through any temporary buffer on the main memory. The IO bus may correspond to Peripheral Component Interconnect Express (PCIe) bus. The memory bus corresponds to Double Data Rate (DDR) bus or Compute Express Link (CXL) bus.

In one embodiment, the target request corresponds to a load operation to retrieve the target contents associated with the target key-word from the storage class memory. In another embodiment, the target request corresponds to a store operation to store the target contents associated with the target key-word to the storage class memory. The key-word can be in any form to represent a unique identifier. For example, it can be an URL, a number, or an ASCII string, depending on the applications.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned earlier, in some applications, a system may need to perform searching, based on certain criterion (e.g. key words), among a large data set. The searching results need to be reported back to an entity requesting the searching. The large data set is often stored in a storage media such as NAND memory. The resulting data are retrieved from the storage media into the main memory. The size of the matched data may be rather large and movement of the matched data to the main memory may consume a lot of power.

For example, in the web server application, the web server can be based on a computer system that services web requests in the form of URL (Uniform Resource Locators). Usually such URLs are received by the networking interface, and the particular URL will be retrieved and stored in the main memory (DRAM). The web server will undertake the task to search the storage subsystem for content associated with the URL. This can be done in one of two ways. One is that the web server shall handle the searching by sending a number of read requests to the storage subsystem. The other is to take advantage of an application co-processor to handling the searching. In the latter case, the CPU shall pass on the URL to the storage application co-processor.

Figure 1:
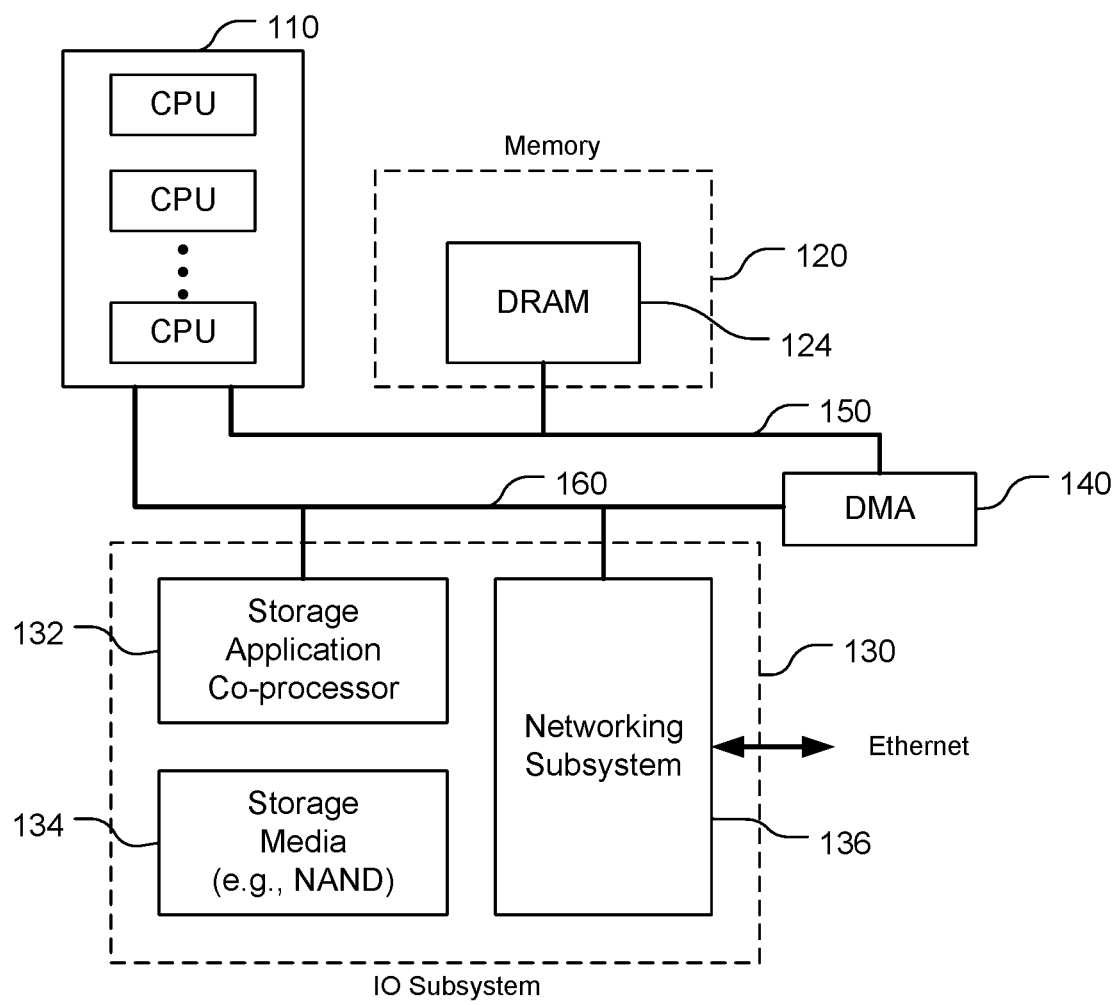
FIG. 1 illustrates an example of a conventional web server using a storage application co-processor coupled to a storage media such as NAND.

FIG. 1 illustrates an example of a conventional web server utilizing a storage application co-processor 132 to perform the search. The exemplary web server in FIG. 1 comprises multiple CPU subsystem 110 and memory subsystem 120. The CPUs are coupled to the memory subsystem via memory bus 150. The memory subsystem comprises main memory (e.g., DRAM) 124. The web server also comprises IO subsystem 130, which includes networking subsystem 136, storage media 134 and storage application co-processor 132. The IO subsystem is coupled to the CPU via IO bus 160. In order to reduce the CPU load, a DMA engine 140 is used to handle data movement with minimum CPU intervention. The DMA engine can access both the memory bus 150 and the IO bus 160 to interact with memory and IO subsystems respectively.

The storage subsystem (i.e., the storage media 134 in this example) is usually organized by 4 KB pages. A read or write request will be targeted at a particular 4 KB designated by the particular page address. The content corresponding to the URL could be in varying size, and its starting page address also takes some effort to compute and process. It is not uncommon for the web server to perform 10-20 read operations to the storage subsystem in order to figure out where the content of the requested URL is located. A storage application co-processor, or Key-Value Store co-processor in this particular case, may be better suited to handle this task than the CPU if it can be placed closer to the storage subsystem. According to the conventional web server design, upon the content of the requested URL is located, the contents of the requested URL will have to be moved (i.e., copied) to the main memory so that the CPU can access the contents of the requested URL to the requestor. Accordingly, the present invention discloses a system that can avoid the movement of the content of the requested URL to and from DRAM.

The CPU has very different interface to the memory from that to the storage. In this invention, we will refer to the memory operations as load and store, and the storage operations as read and write. The CPU performs load and store synchronously, as it will wait for the results within the same process. On the other hand, the CPU performs read and write asynchronously, as it will not wait for the results, and may switch context to a different process.

The CPU interfaces with a storage application co-processor in a similar way as it interfaces to the storage subsystem using read and write operations. In both cases, the requests are placed in the main memory (DRAM), and the storage subsystem or the storage application co-processor are informed of such requests. It is the responsibility of the storage subsystem or the storage application co-processor to fetch the requests from DRAM and process them. In the case of the storage application co-processor, the request could be "search this URL" instead of "read this address" as in the storage subsystem.

Note that the requests often imply certain data movement. In case of a read operation, the data is read from the storage subsystem to DRAM. In case of a write operation, the data is written from DRAM to the storage subsystem. It is customary (and more efficient) not to embed the data inside the request. Instead, the data location, in the form of a scatter-gather-list, is part of the request. In case of the write operation, the storage controller not only retrieve the request, and it will also retrieve the write data from DRAM, following the direction of the gather-list inside the request. In case of the read operation, the storage controller will retrieve the request, and store the read data into DRAM, following the direction of the scatter-list inside the request.

All these data movement was done by the DMA engine at the request of the storage controller, without the involvement of the CPU. As mentioned earlier, these data movement may consume a lot of power. The present invention can avoid such data movement.

The data movement associated with a storage application co-processor is similar. The "search for URL" request may include the location inside DRAM of the URL, and a scatter-list specification where to store the search result. The storage application co-processor shall fetch the request, then the corresponding URL, and then work on searching the database (e.g., Key-Value Store) with the URL. Finally, it shall store the result back to DRAM as specified by the scatter-list in the request. All these data movement was done by the DMA engine at the request of the storage application co-processor without the involvement of the CPU. Again, as mentioned earlier, these data movement may consume a lot of power. The present invention can avoid such data movement.

In the present invention, a computer system incorporating SCM with a memory application co-processor is disclosed to facilitate a "zero-copy" application involved data search. In a computer system according to the present invention, the CPU is coupled to a memory subsystem, where the memory subsystem comprises main memory (e.g., DRAM), Storage Class Memory (SCM) and a memory application co-processor. Compared to the conventional system in FIG. 1, the system according to the present invention moves the functions of storage media and the storage application co-processor to the memory subsystem. In this invention we are concerned with the design of the memory application co-processor using SCM. One of the motivations for this work stems from the fact that a lot of data structure manipulations are inherently memory operations rather than storage operations, and a 4 KB storage interface is not efficient. Therefore, a Key-Value Store would be more efficient to be built on a SCM than on a storage subsystem or SSD.

The interface to a memory application co-processor is also similar to that of a memory operation, or load and store. For example, the CPU can store a number of particular requests to some memory locations designated by the memory application co-processor. As the application co-processor are designed for specific functions, the CPU can store the corresponding data (e.g. URL) to some memory locations designated by the memory application co-processor.

Depending on the latency of the particular requests, the CPU can wait for the results or context switch away and back. The CPU can poll the memory application co-processor to find out the status of the requests. Based on the status of the requests, the CPU can choose to send more requests or not.

The biggest difference between a memory application co-processor and a storage application co-processor is that the system based on the memory application co-processor does not need to move the result back to main memory (DRAM). If the CPU wants to obtain the results from the memory application co-processor, the CPU can issue load operation to retrieve data from SCM and do any certain post-processing. Even if the memory application co-processor moves the data to DRAM, the CPU would still need to issue a load operation to retrieve data from DRAM. Hence the copying from SCM to DRAM is a redundant operation.

In the case the result created by the memory application co-processor is needed by another IO function, as in the case of a web server to send the search result to the remote machine that originates the web search request, the networking interface can access the data inside SCM through DMA directly without the need to copy the retrieved data to the main memory (DRAM). This is because the SCM can be accessed as memory directly, unlike storage. Once again, the memory application co-processor with SCM does not need to copy the result to DRAM, even if the end goal is to send the data to the networking IO.

The memory application co-processor therefore has two performance advantages over the traditional storage application co-processor. First, SCM is faster than the storage media (e.g., NAND) of the conventional approach, and its byte-addressability allows more agile and efficient data manipulation. Second, a memory application co-processor with SCM can achieve zero-copy for retrieving matched data, as the result does not need to be copied to the DRAM. In the above example, a web server that manages the URL datastore is used to illustrate how a computer system incorporates an embodiment of the present invention. However, the present invention is not limited to the web server application. The present invention can be used for general key-word datastore. For example, the key-word datastore may correspond to banking information associated with bank customers. In this case, the key word may correspond to the customer name or account number. The contents of the bank customer comprise a variety of information such as customer personal data and account transactions. According to the present invention, the contents associated with a customer or an account can be retrieved, updated or removed from the account datastore. The contents to be retrieved can stay in the SCM and only the address of the contents is provided to the CPU. When the contents are accessed by the CPU or by a coupled device, the contents can be accessed directly from SCM without the need of copying to the main memory.

Zero-copy has a significant performance impact also for two reasons. First, it is common that the data size of the matched results is much bigger than the requests. For example, the URL search result (the content page) is much larger than the URL itself. Hence, the zero-copy feature for data retrieval from a storage device has a large performance impact. Second, in traditional storage controller or storage application co-processor, the data movement has to be done in a so-called stored-and-forward fashion. In other words, the entire data have to be completely moved from storage to DRAM before the networking can start sending the data off. The two reasons both contribute to the large latency. However, the system based on memory application co-processor with SCM will not have such large latency.

Figure 2:
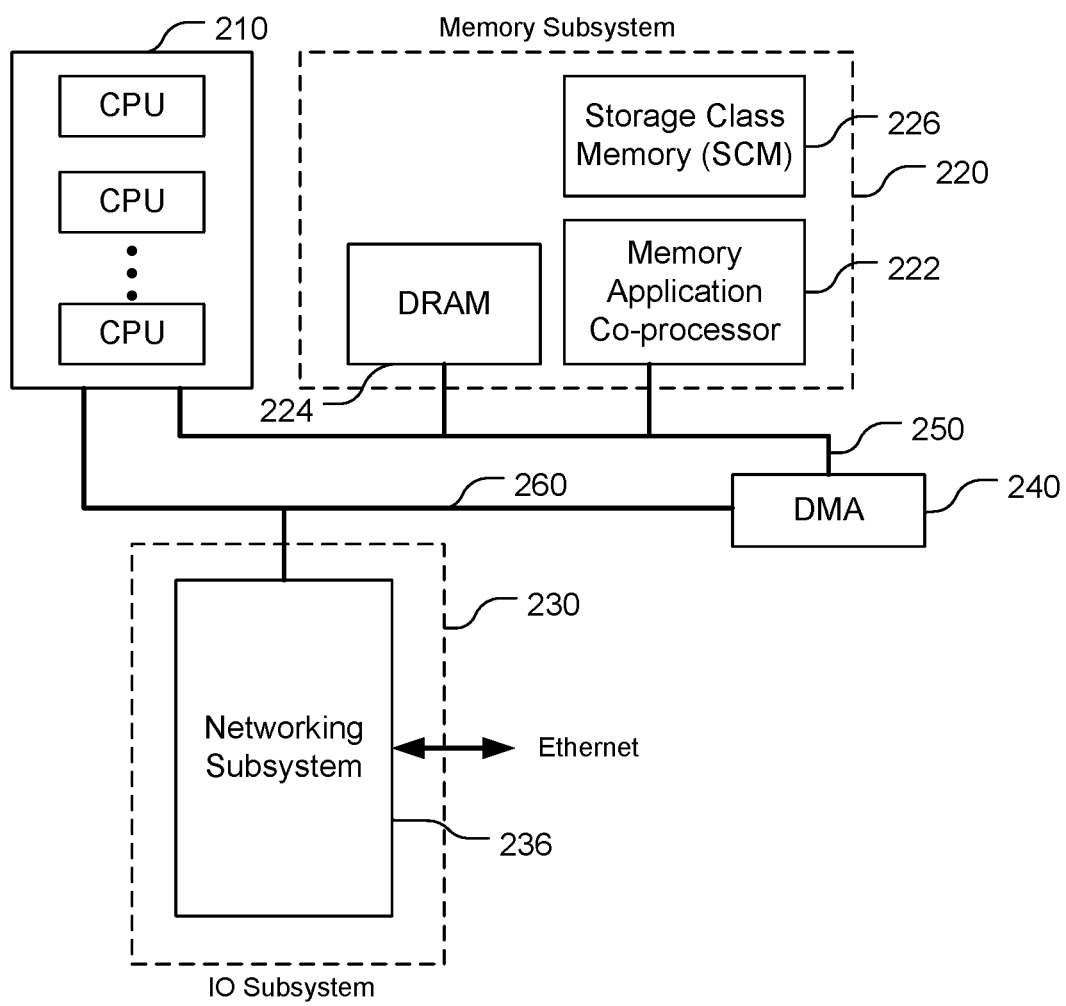
FIG. 2 illustrates an example of a web server incorporating an embodiment of the present invention, where a memory application co-processor is coupled to storage class memory.

FIG. 2 illustrates the architecture of an exemplary computer system incorporating an embodiment of the present invention, where a memory application co-processor with SCM is used. It depicts CPU subsystem 210 interfacing to memory subsystem 220 and IO subsystem 230 through two different buses (i.e., memory bus 250 and IO bus 260). The memory bus 250 may be parallel bus such as (Double Data Rate) DDR bus or serial bus such as (Compute Express Link) CXL bus. The IO bus 260 can be prevailing PCIe (Peripheral Component Interconnect Express) bus. These specific components (e.g., DDR bus, CXL bus, PCIe bus and DRAM) are intended to illustrate examples and should not be construed as limitation to the present invention. Inside the memory subsystem, it depicts two types of memory components, DRAM 224 and Storage Class Memory 226. DRAM usually does not require a separate controller, and its controller is part of the CPU subsystem. Storage Class Memory, on the other hand, requires a controller to perform address translation, ECC and other media management functions. FIG. 2 depicts a memory application co-processor 222 is built on top of the Storage Class Memory controller. In the IO subsystem 230, it comprises a networking subsystem 236 that is used to connect to external world through Ethernet. In this case, the storage subsystem does not need a storage application co-processor or storage media. In this example, the coupled device (i.e., the networking subsystem 236) can access the contents directly with the help of the DMA engine 240.

In the conventional approach with a storage application co-processor coupled to a storage media as shown in FIG. 1, when CPU subsystem 110 wants to issue commands to storage application co-processor 132, the commands and the data movement instructions in the form of scatter-gather lists will be placed in DRAM 124. The storage application co-processor will fetch the commands and data movement instructions. When the storage application co-processor completes the commands, it will follow the data movement instruction to move data from DRAM 124 to storage media 134, or from storage media 134 to DRAM 124, with the help of the DMA engine 140, which causes large data movement.

However, in the computer system incorporating an embodiment of the present invention as shown in FIG. 2, when CPU subsystem 210 wants to issue commands to memory application co-processor 222, the commands and data are written to the memory application co-processor similar to a memory store operation. When the memory application co-processor completes the commands, the resultant data will be kept inside the Storage Class Memory 226 and do not need to be moved to DRAM 224. If needed, only the location of the resultant data will be returned to the CPU subsystem 210.

In the case of a web server according to the conventional approach, the URL request will be received from the networking subsystem 136, and the URL will be stored in DRAM 124 by the help of the DMA engine 140. If a storage application co-processor is employed, the CPU subsystem 110 shall set up the search request, including the location of the URL, and the location where the result should be placed, and place the request inside DRAM 124. The storage application co-processor 132 shall fetch the request with the help of the DMA engine 140, and perform the search inside the storage media 134. When the search result is obtained, the storage application co-processor will store the result back to DRAM 124, following the instruction in the request, with the help of the DMA engine 140. Upon seeing the results arrived, the CPU subsystem 110 shall inform the networking subsystem 136 where the result is located inside DRAM 124, and the networking subsystem 136 shall fetch the data from DRAM 124, by the help of the DMA engine 140, and send the result out through the network.

However, in an embodiment of the present invention for the web server application utilizing a memory application co-processor and SCM, after the networking subsystem 236 stores the URL inside DRAM 224 or SCM 226, the CPU subsystem 210 shall load the search instructions and the URL to the memory application co-processor 222. The memory application co-processor shall search the Storage Class Memory 226 for the result, and when the result is found, the memory application co-processor shall inform the CPU subsystem 210 the location of the result inside Storage Class Memory 226. The CPU subsystem 210 will inform networking subsystem 236 the location of the search result, and the networking subsystem shall fetch the result from Storage Class Memory 226, with the help of the DMA engine 240, and send the result out through the network.

In an example of web server according to the present invention, a datastore can be stored in the SCM. A datastore is a repository for storing, managing and distributing data sets on an enterprise level. It is a broad term that incorporates all types of data that is produced, stored and used by an organization. The datastore may correspond to a particular database associated with the web search. For example, the datastore may comprise URLs and associated contents. The web server may inquire a URL in a search inquiry. The CPU subsystem shall load the search instructions and the URL to the memory application co-processor 222. The memory application co-processor shall search the Storage Class Memory 226 for the result, and when the result is found, the memory application co-processor shall inform the CPU subsystem 210 the location of the result inside Storage Class Memory 226. The CPU subsystem 210 will inform networking subsystem 236 the location of the search result, and the networking subsystem shall fetch the result from Storage Class Memory 226, with the help of the DMA engine 240, and send the result out through the network.

Figure 3:
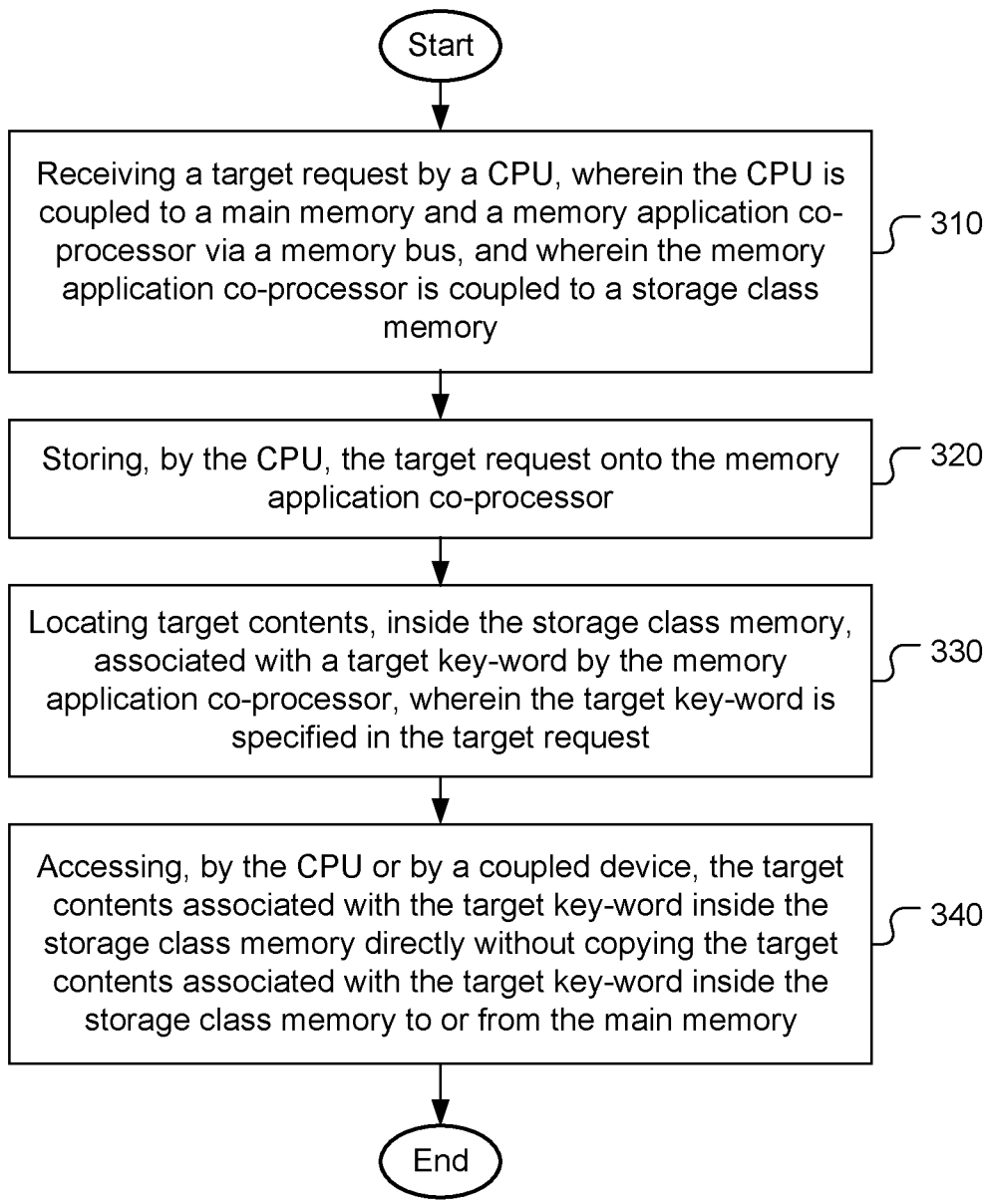
FIG. 3 illustrates an exemplary flowchart of a computer system used as a web server according to an embodiment of the present invention.

FIG. 3 illustrates an exemplary flowchart of a computer system used as a web server according to an embodiment of the present invention. According to this method, a target request is received by a CPU in step 310, where the CPU is coupled to a main memory and a memory application co-processor via a memory bus, and the memory application co-processor is coupled to a storage class memory. The target request can be stored in either main memory or SCM. The CPU then stores the target request onto the memory application co-processor in step 320. The target contents, inside the storage class memory, associated with a target key-word are located by the memory application co-processor in step 330, where the target key-word is specified in the target request. The target contents associated with the target key-word inside the storage class memory are accessed by the CPU or by a coupled device directly without copying the target contents associated with the target key-word inside the storage class memory to or from the main memory in step 340.

The flowchart shown above is intended to illustrate an example of a computer system used as a web server incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of managing online transaction using a computer system, the method comprising:
   receiving a target request by a CPU, wherein the CPU is coupled to a main memory and a memory application co-processor via a memory bus, and wherein the memory application co-processor is coupled to a storage class memory;
   storing, by the CPU, the target request onto the memory application co-processor;
   locating target contents, inside the storage class memory, associated with a target key-word by the memory application co-processor, wherein the target key-word is specified in the target request; and
   accessing, by the CPU or by a coupled device, the target contents associated with the target key-word inside the storage class memory directly without copying the target contents associated with the target key-word inside the storage class memory to or from the main memory.

2. The method of claim 1, wherein said accessing the target contents associated with the target key-word inside the storage class memory is configured by a DMA (direct memory access) engine coupled to the memory bus.

3. The method of claim 2, wherein the computer system corresponds to a web server and the coupled device corresponds to a networking interface coupled to the CPU via an IO bus, and wherein the target key-word corresponds to a target URL (Uniform Resource Locator).

4. The method of claim 3, wherein the target contents associated with the target URL are accessed directly from the storage class memory by the network interface through the DMA engine.

5. The method of claim 1, wherein the target request corresponds to a load operation to retrieve the target contents associated with the target key-word from the storage class memory.

6. The method of claim 1, wherein the target request corresponds to a store operation to store the target contents associated with the target key-word to the storage class memory.

7. An apparatus for provisioning online transaction, the apparatus comprising:
   a CPU;
   a main memory;
   a memory application co-processor;
   a storage class memory, wherein the CPU is coupled to the main memory and the memory application co-processor via a memory bus, and wherein the memory application co-processor is coupled to the storage class memory; and wherein the CPU and the memory application co-processor are configured to perform at least the following:
receive a target request by the CPU;
store, by the CPU, the target request onto the memory application co-processor;
locate target contents, inside the storage class memory, associated with a target key-word by the memory application co-processor, wherein the target key-word is specified in the target request; and
access, by the CPU or by a coupled device, the target contents associated with the target key-word inside the storage class memory directly without copying the target contents associated with the target key-word inside the storage class memory to or from the main memory.

8. The apparatus of claim 7, further comprising a DMA (direct memory access) engine coupled to the memory bus, wherein the DMA engine is configured to access the target contents associated with the target key-word inside the storage class memory.

9. The apparatus of claim 8, wherein the coupled device corresponds to a networking interface coupled to the CPU via an IO bus, and wherein the target key-word corresponds to a target URL (Uniform Resource Locator).

10. The apparatus of claim 9, wherein the target contents associated with the target URL are accessed directly from the storage class memory by the network interface through the DMA engine.

11. The apparatus of claim 9, wherein the IO bus corresponds to Peripheral Component Interconnect Express (PCIe) bus.

12. The apparatus of claim 7, wherein the memory bus corresponds to Double Data Rate (DDR) bus or Compute Express Link (CXL) bus.

13. The apparatus of claim 7, wherein the target request corresponds to a load operation to retrieve the target contents associated with the target key-word from the storage class memory.

14. The apparatus of claim 7, wherein the target request corresponds to a store operation to store the target contents associated with the target key-word to the storage class memory.

* * * * *